US012688073B2

(12) United States Patent
Ferreira et al.

(10) Patent No.: US 12,688,073 B2
(45) Date of Patent: Jul. 21, 2026

(54) ADAPTABLE RESPONSE TIME PREDICTION FOR STORAGE SYSTEMS UNDER VARIABLE WORKLOADS

(71) Applicant: Dell Products L.P., Round Rock, TX (US)

(72) Inventors: Paulo Abelha Ferreira, Rio de Janeiro (BR); Pablo Nascimento da Silva, Niterói (BR); Adriana Bechara Prado, Niterói (BR)

(73) Assignee: Dell Products L.P., Round Rock, TX (US)

( * ) Notice: Subject to any disclaimer, the term of this patent is extended or adjusted under 35 U.S.C. 154(b) by 989 days.

(21) Appl. No.: 17/929,865

(22) Filed: Sep. 6, 2022

(65) Prior Publication Data

US 2024/0078137 A1 Mar. 7, 2024

(51) Int. Cl.
*G06F 9/50* (2006.01)

(52) U.S. Cl.
CPC ............ *G06F 9/505* (2013.01); *G06F 9/5072* (2013.01); *G06F 9/5077* (2013.01); *G06F 2209/5019* (2013.01); *G06F 2209/5022* (2013.01); *G06F 2209/505* (2013.01)

(58) Field of Classification Search
CPC ...... G06F 9/505; G06F 9/5072; G06F 9/5077; G06F 2209/5019; G06F 2209/5022; G06F 2209/505; G06N 20/20
See application file for complete search history.

(56) References Cited

U.S. PATENT DOCUMENTS

| | | | | |
|---|---|---|---|---|
| 6,438,519 B1* | 8/2002 | Campbell | ........... | G06F 18/2453 704/231 |
| 7,843,843 B1* | 11/2010 | Papp, III | ............. | H04L 47/2408 370/395.42 |
| 8,112,586 B1* | 2/2012 | Reiner | ................ | H04L 67/2885 711/119 |
| 8,769,676 B1* | 7/2014 | Kashyap | ............... | G06F 21/554 726/22 |
| 8,782,341 B1* | 7/2014 | Niranjan | ................. | G06F 3/067 711/114 |
| 10,489,745 B1* | 11/2019 | Verroios | ................. | G06F 17/18 |
| 11,227,047 B1* | 1/2022 | Vashisht | ................ | G06N 20/00 |
| 11,941,454 B1* | 3/2024 | Gupta | ................. | G06F 9/45533 |
| 12,056,579 B1* | 8/2024 | Mattar | ................... | G06N 20/00 |
| 12,099,937 B2* | 9/2024 | Neumann | ................ | G06N 3/08 |
| 12,183,061 B2* | 12/2024 | Capellier | ............. | G06V 10/762 |
| 12,388,761 B2* | 8/2025 | Palanisamy | ............. | H04L 41/16 |

(Continued)

OTHER PUBLICATIONS

U.S. Appl. No. 16/865,465, titled "Workload-Oriented Prediction of Response Times of Storage Systems," filed May 4, 2020.

(Continued)

*Primary Examiner* — Benjamin C Wu
(74) *Attorney, Agent, or Firm* — Workman Nydegger

(57) ABSTRACT

One example method includes running a workload through a trained open-set classification model, recovering, as a result of the running, a class and an open-setness score corresponding to the workload, determining, based on the class and the open-setness score, whether the workload is new, and when the workload is determined to be new, starting a new cluster that includes the workload. A response time predictor model may be used to predict a response time associated with the new workload.

20 Claims, 9 Drawing Sheets

(56) References Cited

U.S. PATENT DOCUMENTS

| | | | | |
|---|---|---|---|---|
| 2005/0105712 A1* | 5/2005 | Williams | G10L 13/027 |
| | | | 704/275 |
| 2007/0136455 A1* | 6/2007 | Lee | G06F 21/564 |
| | | | 709/223 |
| 2013/0138657 A1* | 5/2013 | Govindarao | G06F 18/22 |
| | | | 707/740 |
| 2014/0089509 A1* | 3/2014 | Akolkar | H04L 43/04 |
| | | | 709/226 |
| 2014/0207716 A1* | 7/2014 | Hsu | G06F 16/35 |
| | | | 706/12 |
| 2015/0271023 A1* | 9/2015 | Anderson | H04L 41/145 |
| | | | 709/223 |
| 2015/0356451 A1* | 12/2015 | Gupta | G06F 21/552 |
| | | | 706/46 |
| 2016/0092790 A1* | 3/2016 | Ribeiro Mendes Júnior | |
| | | | G06N 20/00 |
| | | | 706/12 |
| 2017/0046510 A1* | 2/2017 | Chen | G06F 21/552 |
| 2017/0109205 A1* | 4/2017 | Ahuja | G06F 9/5094 |
| 2018/0024859 A1* | 1/2018 | Doshi | G06F 9/5094 |
| | | | 718/104 |
| 2018/0025289 A1* | 1/2018 | Doshi | G06N 20/00 |
| | | | 706/12 |
| 2018/0131620 A1* | 5/2018 | Su | H04L 47/2441 |
| 2018/0314533 A1* | 11/2018 | Azhen | H04L 41/145 |
| 2019/0147336 A1* | 5/2019 | Yu | G06N 3/094 |
| | | | 706/15 |
| 2019/0319977 A1* | 10/2019 | Gottschlich | G06F 18/214 |
| 2019/0334770 A1* | 10/2019 | Xiang | H04L 41/5025 |
| 2020/0026566 A1* | 1/2020 | Baggerman | G06F 40/186 |
| 2020/0034749 A1* | 1/2020 | Kumar | G06F 16/24578 |
| 2020/0045063 A1* | 2/2020 | Zhang | G06F 21/55 |
| 2020/0167194 A1* | 5/2020 | Filho | G06F 9/4881 |
| 2020/0183769 A1* | 6/2020 | Poghosyan | G06F 11/0751 |
| 2020/0249962 A1* | 8/2020 | Vichare | G06F 9/5083 |
| 2020/0366717 A1* | 11/2020 | Chaubey | H04L 63/20 |
| 2021/0342631 A1* | 11/2021 | Takahashi | G06T 7/00 |
| 2021/0357648 A1* | 11/2021 | Metaxas | G06V 10/772 |
| 2022/0129316 A1* | 4/2022 | Sheoran | G06F 9/5011 |
| 2022/0253689 A1* | 8/2022 | Lange | G06N 3/09 |
| 2022/0335317 A1* | 10/2022 | Segner | G06N 20/00 |
| 2022/0345518 A1* | 10/2022 | Sgobba | H04L 67/10 |
| 2023/0298572 A1* | 9/2023 | Kim | G10L 15/063 |
| | | | 704/232 |
| 2024/0004889 A1* | 1/2024 | Kim | G06F 16/2462 |
| 2024/0020571 A1* | 1/2024 | Ferreira | G06N 3/0455 |
| 2024/0078137 A1* | 3/2024 | Ferreira | G06N 3/08 |
| 2024/0095081 A1* | 3/2024 | Mäder | G06N 3/08 |
| 2024/0224072 A1* | 7/2024 | Mahimkar | H04W 24/02 |
| 2024/0383133 A1* | 11/2024 | Bydlon | A61B 90/37 |
| 2024/0395025 A1* | 11/2024 | Mavroeidis | G06V 10/776 |
| 2025/0080610 A1* | 3/2025 | Roedler | G06V 20/41 |

OTHER PUBLICATIONS

Poojan Oza and Vishal M. Patel, "C2ae: Class Conditioned Auto-Encoder for Open-Set Recognition." Proceedings of the IEEE/CVF Conference on Computer Vision and Pattern Recognition, pp. 2307-2316. 2019.

* cited by examiner

ADAPTABLE RESPONSE TIME PREDICTION FOR STORAGE SYSTEMS UNDER VARIABLE WORKLOADS

FIELD OF THE INVENTION

Embodiments of the present invention generally relate to determining hardware and/or software resource needs in response to new and changing workloads. More particularly, at least some embodiments of the invention relate to systems, hardware, software, computer-readable media, and methods, for establishing and maintaining an adaptable response time prediction model for different computing systems and components, such as storage array systems for example, in response to possible encounters with unknown and variable workloads.

BACKGROUND

An important part of selling equipment and other resources, such as computing system equipment such as storage systems, software, and other computing resources, is defining the type, scope, and configuration, of the resources since those should be compliant with the characteristics and needs of the customers. This process, at least in the example context of data storage systems, is called sizing and it is often performed without exact knowledge as to whether the sized infrastructure will satisfy the response-time requirements of the end user applications, that is, whether the infrastructure will be able to perform a workload or a portion of a workload within a particular amount of time specified by an end user or end user application.

Various machine learning techniques have been proposed to address this problem automatically, such as by predicting the system configuration based on workload characteristics and desired response times. However, one problem often encountered in these approaches is the limitations in the variety of data collections from different systems and workload types. Thus, the problem of predicting response times by exploiting telemetry data coming from different storage systems poses various challenges, examples of which are addressed below.

The first of such problems, or challenges, is that the telemetry data must have adequate quality. Particularly, the quality of the data used in any machine learning (ML) task has a big effect on the likelihood that the task will be successfully performed. Normally, there is a huge amount of information coming from telemetry data. Selecting the set of records and/or attributes, that best represent the problem in question is not a trivial task. A filtering step is often needed so as to discard, from the raw data that has been collected, records and/or attributes that are not informative/relevant enough, such as attributes with too many missing values, for example. Concomitantly, linear or nonlinear combinations of the raw available attributes may be more informative than many individual attributes, which can always be added to the data.

Another challenge with current approaches is that predictions must be accurate. Particularly, since users may be sensitive to their requirements in terms of response times, the inability of current approaches to provide an accurate model that can output its predictions within an acceptable error margin is problematic.

Further, conventional approaches are unable to predict new observations sufficiently fast. Moreover, the predictions generated by such approaches lack robustness and are unable to accommodate variable workloads. For example, some conventional approaches are focused on building an ML model for given, static, datasets. However, it is reasonable to expect that new workloads will appear for storage systems in the same customer and across customers. In that case, the model would have to be prepared to deal with these unknown workloads. Since some conventional approaches rely on clustering to find the most suitable cluster for a workload, those approaches would fail in the case of an unknown workload that might belong to a new cluster not previously seen by the model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
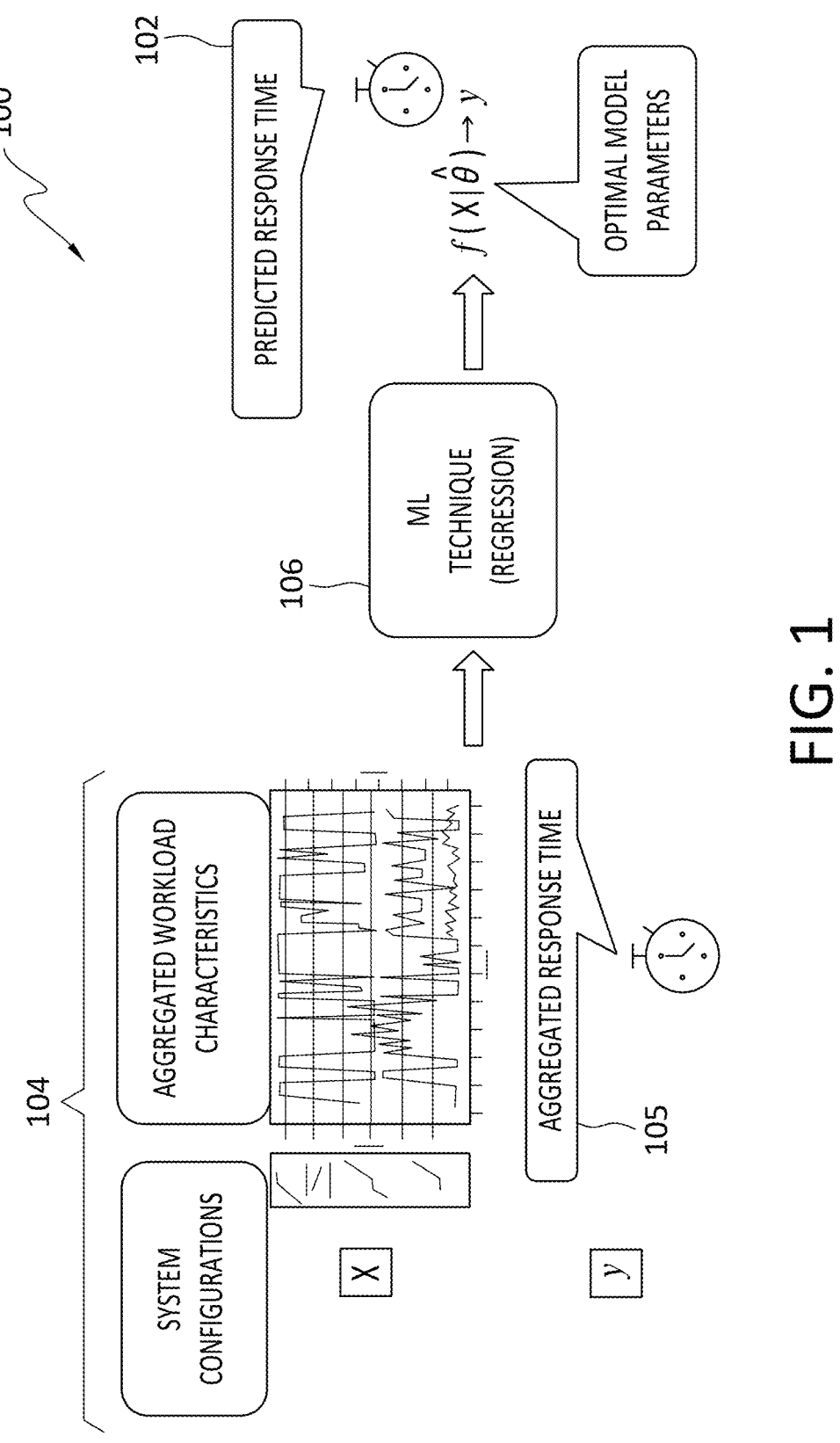
FIG. 1 discloses an example of mapping telemetry data to response times, using Machine Learning (ML).

Embodiments of the present invention generally relate to determining hardware and/or software resource needs in response to new and changing workloads. More particularly, at least some embodiments of the invention relate to systems, hardware, software, computer-readable media, and methods, for establishing and maintaining an adaptable response time prediction model for different computing systems and components, such as storage array systems for example, in response to possible encounters with unknown and variable workloads.

In general, some example embodiments of the invention are concerned with predicting resource needs even when one or more workloads to be executed by the resources are unknown and/or unanticipated. Particularly, some embodiments are directed to a method and ML model that are operable to both identify and classify new workloads, that is, workloads that have not previously been seen or considered by the ML model. After a new workload has been identified and classified, a prediction may be made as to the type and scope of resources that are expected to be needed to support execution of the workload so as to satisfy any applicable constraints, one example of which may be a service level agreement (SLA).

In more detail, some embodiments are directed to machine learning (ML) models which are operable to handle the cases when predictions have to be made for workloads unseen by the ML model in the ML model training phase, which may degrade the performance of the models. Thus, some embodiments may combine open-set classification with cluster membership calculation techniques as a mechanism to build a robust classifier that is able to classify new workloads. Such a combination may create a model that is capable to (1) identify if a given workload is new to the system, that is, to the model, and (2) instantiate a specialized predictor capable of addressing this new type of data. In some embodiments, workloads coming from different storage systems may be grouped into different clusters and used in different prediction models.

Note that reference is made herein to an illustrative case where the resource comprises data storage, and the workloads comprise data generation and/or data storage. However, this illustrative case is presented only by way of example and is not intended to limit the scope of the invention in any way.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, an embodiment may comprise an ML model that is operable to determine resource requirements to support a workload that the ML has not seen before. An embodiment may be able to determine whether or not a workload is new. An embodiment may be able to instantiate a predictor to address a new workload. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for Some Example Embodiments

In general, some example embodiments may involve the creation, training, modification, and/or, use, of one or more ML models which may be operable to accurately and efficiently predict response times, that is, an amount of time needed by a particular system or infrastructure to perform a workload or a portion of a workload specified by an end user or end user application. Thus, the following discussion of contexts for some example embodiments includes a brief overview of ML tasks that may be applied in the context of this invention, namely, open-set models, supervised learning, and clustering.

A.1 Open-Set

Open-set models may be extensions of the Support Vector Machine (SVM) canonical formulation. One example of an open-set model approach is disclosed in Oza, Poojan, and Vishal M. Patel. *"C2ae: Class conditioned auto-encoder for open-set recognition." Proceedings of the IEEE/CVF Conference on Computer Vision and Pattern Recognition.* 2019, ("Oza"), incorporated herein in its entirety by this reference, where the authors disclose a modified auto-classifier. Open-set models may thus be applied to a wide range of domains, including domains contemplated by some example embodiments of the invention.

Supervised learning methods may have the underlying strong assumption of complete knowledge of the mappings from raw data to classes. In more technical terms, this means that these models do have an assumption of a mutually exclusive, collectively exhaustive (MECE), mapping from the feature domain to the finite set of classes that the model was trained on. While this assumption might be correct for some kinds of tasks, such as, for instance, predicting the real number of a drawn digit or classifying an image in a set of finite classes, the fact is that, in the real world, it is almost never the case that the available annotated/training data for some ML task contains all the possible classes of the domain. However, relaxing this assumption of MECE mapping from feature to classes generates challenges. One particular challenge is how to design ML models that are capable of distinguishing from each of its known classes and the unknown. This kind of task is not naturally tackled by any of the generic ML models commonly used such as Random Forests, Support Vector Machines (SVM) or Deep Neural Networks (DNNs). In particular, DNNs used for classification commonly apply a softmax function activation in the end, which means every single observation of the feature space will be mapped to one of its known classes.

The following discussion addresses some aspects of C2AE, that is, a Class-Conditioned AutoEncoder for open-set classification. In a traditional supervised-learning setting, the aim is to train a classifier that deals only with known classes in what is sometimes referred to as a closed-set world. However, open-set scenarios provide a more realistic, and challenging, setting, where there might be one or more classes that are not available at training time. Open-set models may be extensions of the SVM canonical formulation, where sophisticated statistical models are used to enclose/bound the dual spaces created by the SVM, which would otherwise be unbounded. One example of an approach is the C2AE disclosed in Oza, where the authors use a modified auto-classifier.

The C2AE training may comprise two main stages, namely, closed-set training in which the model is trained as a standard auto-classifier, and open-set training. The open-set training may, in turn, comprise various elements. For example, the open-set training may include conditional decoder training that may serve to train the auto-classifier to perform a good reconstruction of the label of its input data, but to perform a bad reconstruction when conditioned on other labels, and performing this operation for all labels but the label for the input data.

Another element of open-set training may be EVT (Extreme Value Theory) modeling, which may be used to model the tail of a distribution with a Generalized Pareto Distribution (GPD). Then, a threshold may be found from which to define what are the extreme values of the original distribution.

Finally, an open-set training process may include threshold calculation. In general, this may involve finding the threshold in the intersection of the reconstruction error histograms for matching and non-matching classes using the EVT modeling referred to earlier herein. Note that C2AE has its own, different, open-set test stage, namely, k-inference. That is, at test time, the input received by the model may be tested against all known classes as conditioning vectors. Then, the minimum reconstruction error may be tested against the calculated threshold during training, and if this minimum is less than the threshold, it may be output as the predicted class, otherwise, the predicted class may be identified as an unknown class.

A.2 Supervised Learning

As some example embodiments may have input and output examples coming from telemetry data, a particular ML task referred to as supervised regression, which may comprise regressing, or inferring, a numeric output value from one or more input values, may be employed. For this, a dataset may be needed that contains various examples of input values matched to all their corresponding output values. The task is then to learn a mapping that accurately maps the input to the output—this learning may take place during what may be referred to as a training stage and it uses what may be referred to as a training set. Accuracy may be defined through some metric defined a priori that takes in a test set that has never been seen during the training stage. FIG. 1 discloses an example process 100 that maps telemetry data to response times, via a ML regression task.

In particular, and with reference to the example of FIG. 1, some example embodiments may be directed to the prediction of a single response time 102, such as a single output numeric value, from inputs 104 comprising workload characteristics and system configurations. The inputs (X) 104 may be used to generate an output (Y) comprising an aggregated response time 105. For a single input 104, each one of its attributes may be referred to as a feature. One example of an ML model that can perform such a task is a regression Random Forest (RF) 106. An RF is an ensemble of decision trees, and corresponds to an ML ensemble model capable of efficiently being trained and performing inference for classification and regression. A regressor RF may predict a numeric output value by exploiting what are referred to as decision trees. Each decision tree runs the input through a series of questions regarding feature values until it ends up in a leaf of the decision tree. This leaf contains the predicted output value for the given input.

A.3 Clustering

Figure 2:
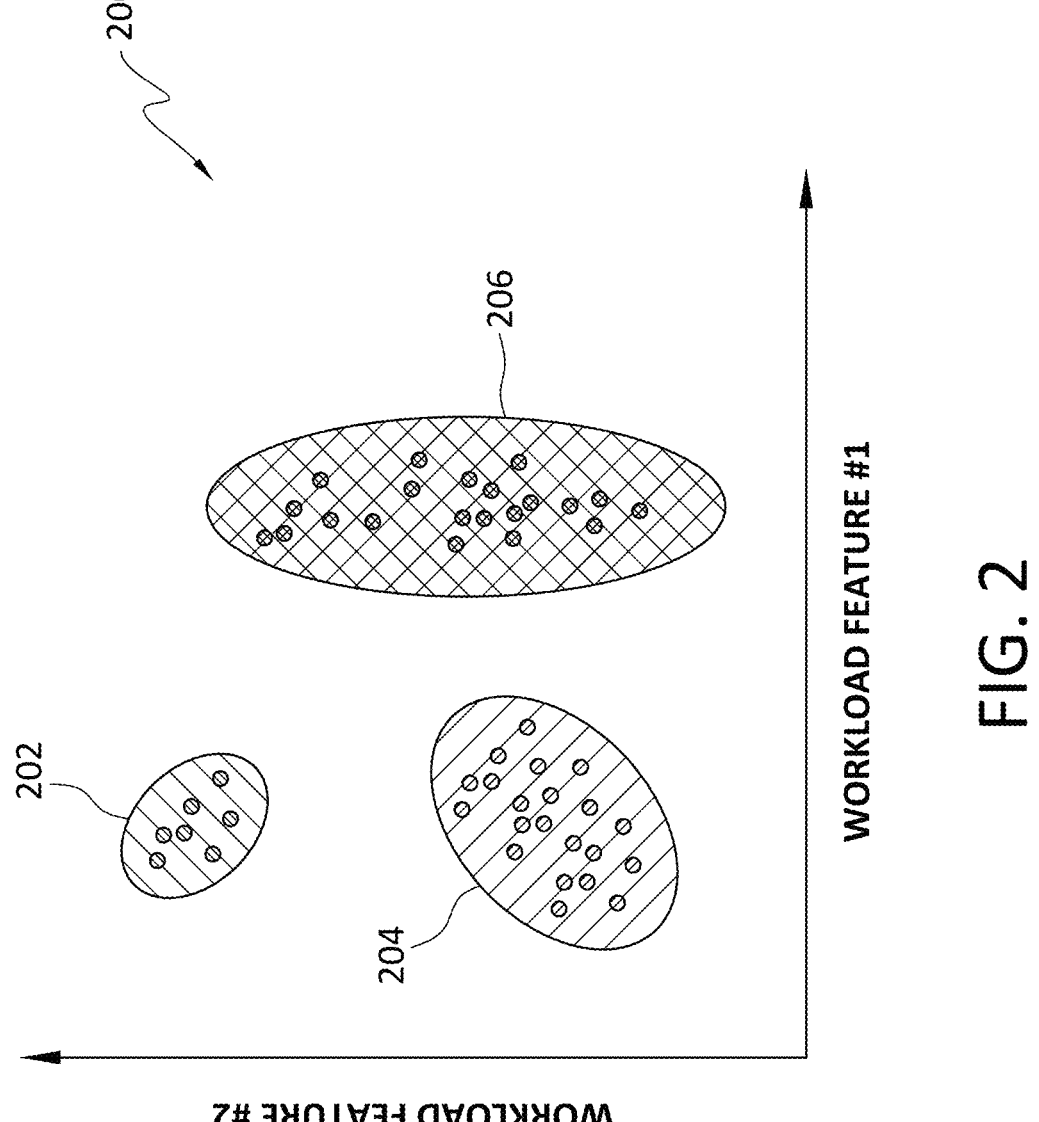
FIG. 2 discloses an example of clustering data into separate groups, using workload features for example.

As used herein, 'clustering' includes the ML task of grouping a set of examples in such a way that examples in the same group, or cluster, are more similar to each other than those in other groups of instances, that is, other clusters. The particular method to be used for clustering may depend on the domain and features. Some embodiments may not involve a high number of features, or high dimensionality, and as such, there exists the possibility of applying a wide range of methods and techniques to obtain clusters. FIG. 2 discloses a plot 200 in which data is clustered into three separate groups 202, 204, and 206. The data may be clustered according to various bases such as, for example, workload features as shown in FIG. 2. Clustering algorithms may automatically group data points in a given space of features.

A.4 Workload Clustering for Response Time Prediction

As noted earlier herein, some embodiments are directed to the prediction of a single response time (single output numeric value) from workload characteristics and system configurations (input values). To this end, some embodiments may employ the following method:

for every storage system model, such as Dell PowerMax 8000, and Dell PowerMax 2000, for example, and for the predictions of read and write response times, the operations may include:

(i) pre-processing data (data cleaning);

(ii) add necessary new features to clean data (feature engineering);

(iii) group workloads according to their characteristics, forming clusters of similar workload types;

(iv) build a specialist prediction model for each cluster; and (v) apply the prediction models to new input.

Further details will now be provided concerning the aforementioned operations.

(i) Data cleaning—this may involve leveraging domain knowledge about the telemetry data to pre-process it, so as to ensure high-quality data—for example, (i) data associated with older system configurations may not be relevant to the problem in hand, or (ii) records associated to response times outside "expected ranges" may be regarded as outliers and, therefore, be discarded.

(ii) Feature engineering—new features may be added to the data. As an aim of some embodiments is to characterize the telemetry by types of workloads, features such as I/O reads (in %), I/O sequential reads (in %), I/O read hits (in %) and I/O write hits (in %), among others, may be created and used.

Figure 3:
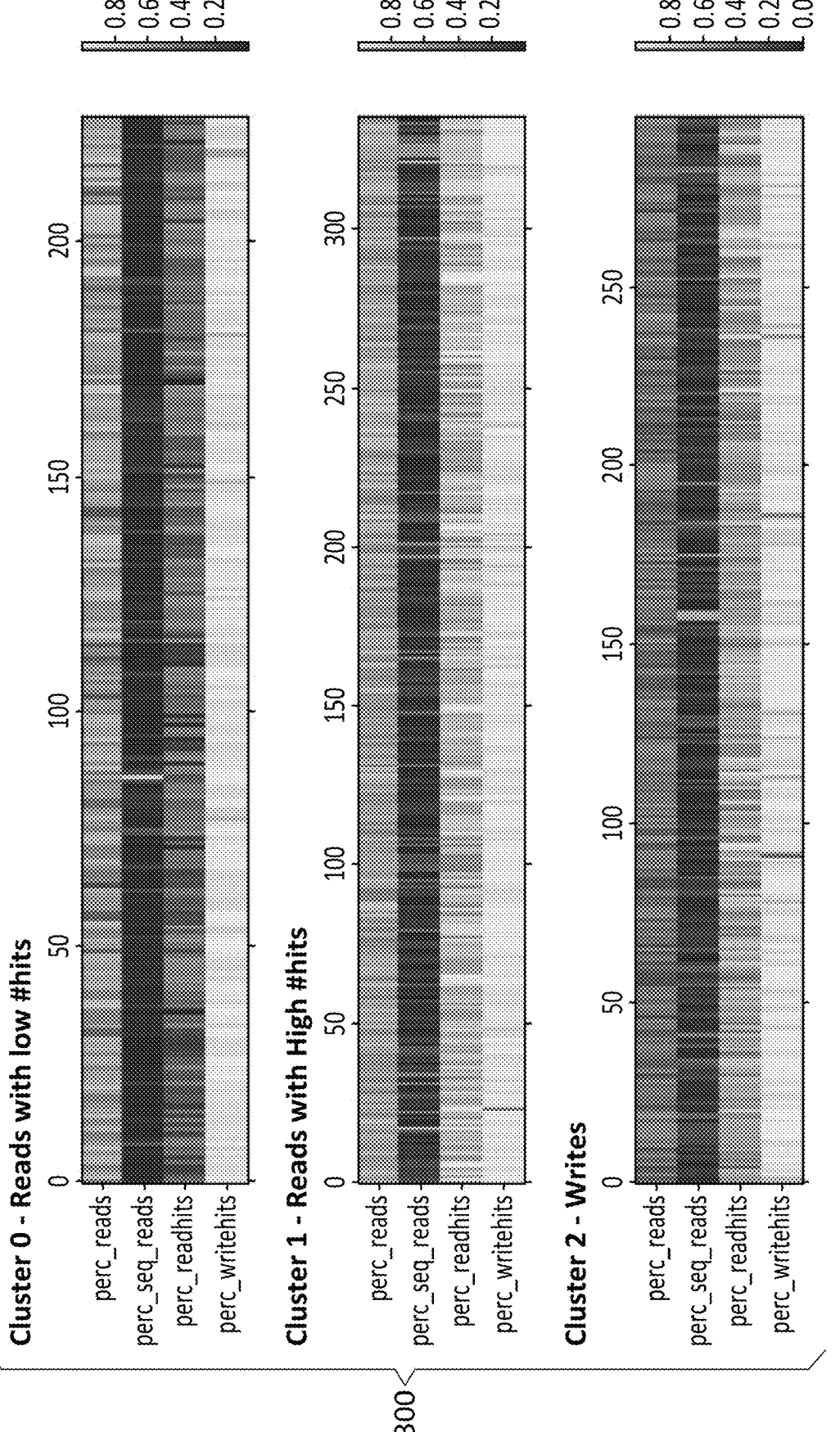
FIG. 3 discloses an example of 3 clusters representing different workload types.

(iii) Machine Learning phase—in this phase, the workload-oriented prediction models are trained with the filtered data, leveraging the newly added features. In this phase we also perform workload characterization via clustering. In this step, the idea is to employ a clustering algorithm (such as k-means or expectation-maximization) to group workloads according to their characteristics. The output of such algorithm is a set of clusters, where each cluster represents a workload type. FIG. 3 depicts an example set of found clusters 300 that includes Cluster 0, Cluster 1, and Cluster 2. Embodiments may also perform the operation of building workload-oriented prediction models, where a specialized regression model may be built for each cluster found in the previous operation. Each cluster of data may then used to train a particular respective prediction model.

Note that in the illustrative example of FIG. 3, the workloads represented by the clusters are input/output (IO)

operations, such as reads and writes, that would be performed in connection with the operation of a data storage system. The scope of the invention is not limited to such workloads, nor to storage systems. Rather, the examples of FIG. 3 are presented solely for the purposes of illustration and other embodiments may be employed in connection with different systems and/or different workloads.

In more detail, each rectangle in FIG. 3 represents a cluster and each line of each rectangle corresponds to a feature. The lighter the color of the line, the higher the values of the corresponding feature. Each cluster represents a given workload type. In this illustrative and non-limiting example, Cluster 0 represents workloads with a low percentage of read hits (the third line is more gray than white), Cluster 1 represents workloads with high percentage of read hits (the third row is more white than gray), and Cluster 2 represents write-intensive workloads (the first row is more gray than white).

Figure 4:
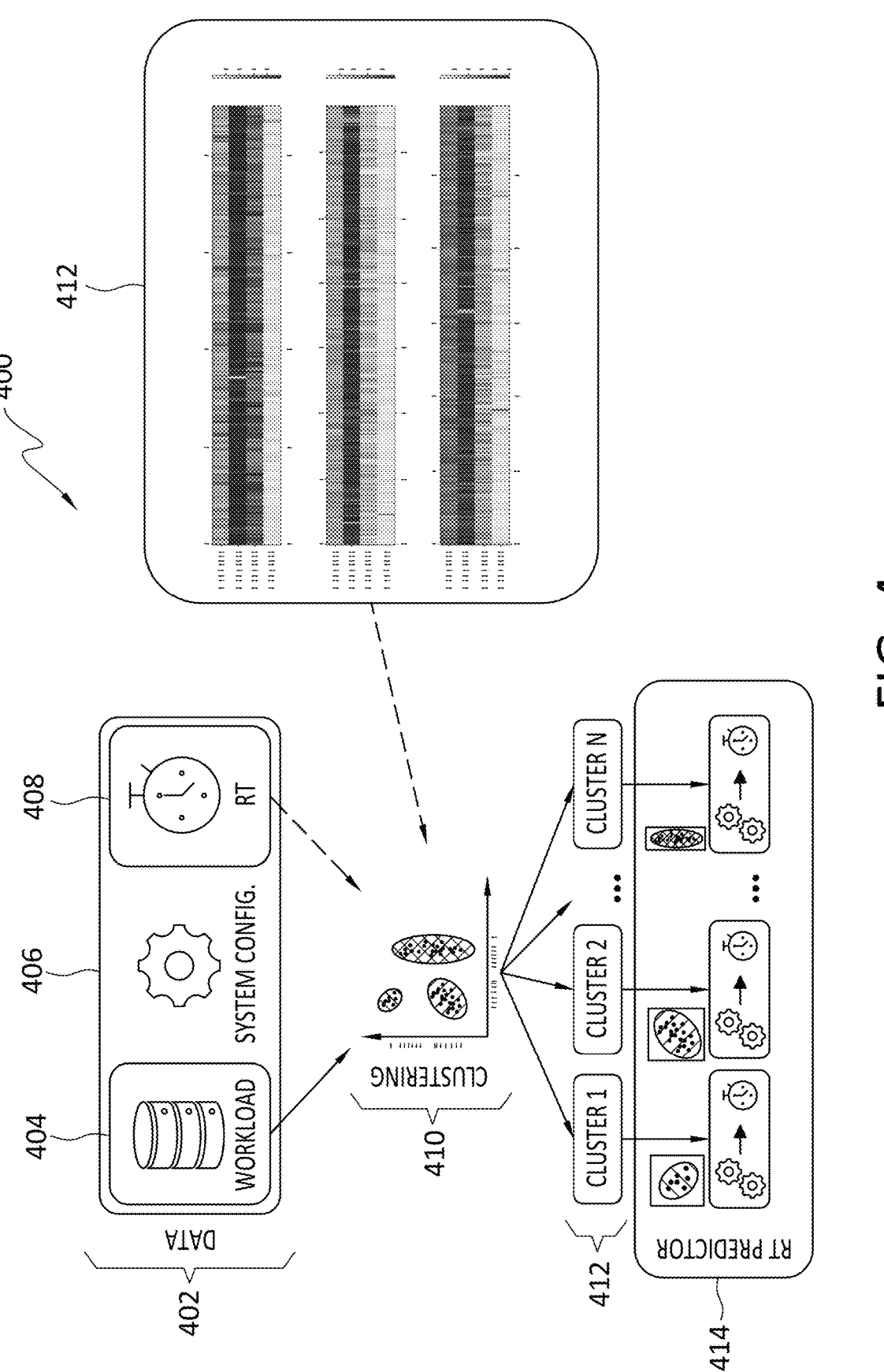
FIG. 4 discloses an example training procedure in which a method first employs a clustering method for finding different workload types, and then a specialized prediction model is trained for each cluster.

FIG. 4 discloses a comprehensive process 400 of training specialized prediction models for each type of workload found in the example data clusters 300 of FIG. 3. In particular, and as shown in FIG. 4, the input data 402 may comprise various elements including, but not limited to, workload characteristic information 404, system configuration information 406, and response time data 408. The input data 402 may comprise ground truth information about a current, or previously existing, system and its operations. The input data 402 may then be subjected to a clustering operation 410 which may operate to generate clusters 412 based on one or more elements of the input data 402. Each of the clusters 412 may correspond to a different respective workload type. Based on the clusters 412, response times by the system may be predicted for each workload, such as by way of a response time (RT) predictor model 414. A different respective RT predictor model may be used for each cluster. The predicted response times may be used, for example, to determine whether the system requires additional resources in order to provide better response times, such as to IO requests, for example.

Figures 5, 6:
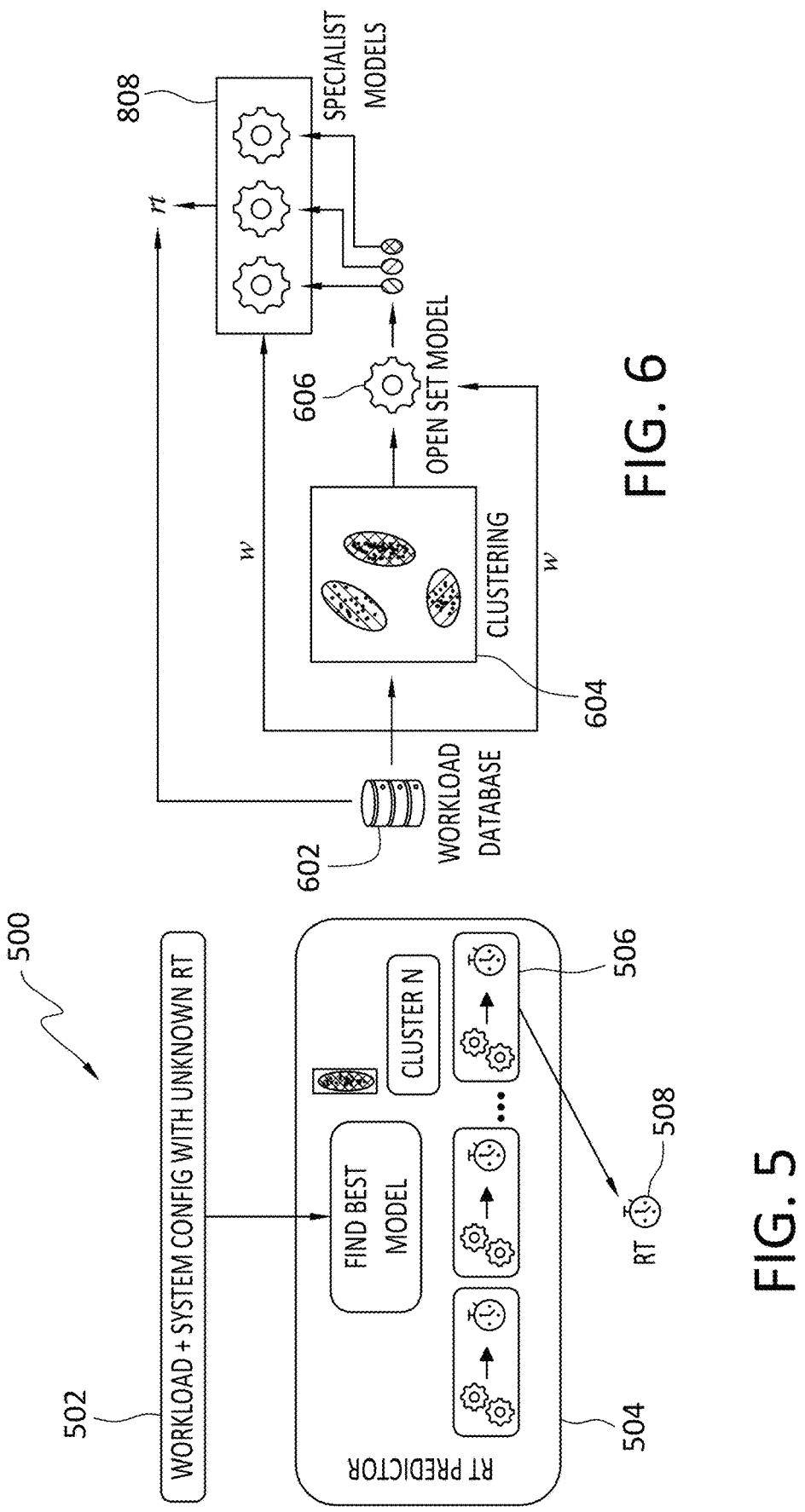
FIG. 5 discloses an example of applying the most suitable prediction model to a new input in order to predict its response time.
FIG. 6 discloses an overview of an example training stage.

In more detail, having trained a specialized predictor model for each type of workload, it may be necessary to select which is the best prediction model to predict the response time of a new input, that is, when the response time is unknown. To this end, some embodiments may apply a distance function, such as Euclidean distance for example, between the new input features, after creating the necessary features, and each cluster centroid. The predictor model selected to predict the new input may be the predictor model associated with the cluster, such as the cluster 'N' in FIG. 5, whose distance between its centroid and the input is the shortest. FIG. 5 depicts an example process.

In particular, FIG. 5 discloses a method 500 for applying the most suitable prediction model to a new input in order to predict its response time. As shown, a workload+system configuration 502, with an unknown response time, may be provided as input to an RT predictor model 504. The RT predictor model 504, which may be associated with a particular cluster 'N,' may apply a distance function to determine the best prediction model 506 to determine the response time 508 for the input 502.

B. Aspects of Some Example Embodiments

Sizing may be an important step when defining the right infrastructure of storage arrays to support customer needs. However, sizing is often performed without knowledge as to whether the sized infrastructure will satisfy the response-time requirements of the end user applications. This situation may happen when, for example, limited workload information is available. Using ML to predict response times for storage arrays from workloads and system characteristics may achieve low error.

The idea of clustering workloads may improve a model and make it more robust. However, even with a good clustering model and a good estimator of response times, there remains the problem of dealing with unknown workloads. The insight behind using clustering methods is that a particular workload type running in a particular storage system model, with its own system configuration, has its own expected response time ranges, that is, the amount of time that it takes the system to perform the workload, which may comprise IOs and/or other operations.

Some example embodiments are accordingly directed to a method based on combining open-set classification with cluster membership calculation methods to address the problem of response time prediction under variable workloads. One aspect of some embodiments is combining disparate techniques in a framework for robust response time classification for storage systems telemetry. The resulting method may be able to adapt to novel workloads, incorporating those new workloads, and/or information about them, into the clustering and prediction mechanism.

B.1 Overview

Some approaches have operated to cluster workloads according to their features and then build one model per workload cluster. At inference time, the best matching cluster to our workload is found, and that model used for that cluster. This idea however is limited in that it does not deal with the problem of highly variable, and possibly new, workloads. That is, especially, when there is a workload that does not fit well in any of the clusters.

As such, some embodiments are directed to methods which combines open-set classification with cluster membership calculation techniques. Such a combination of functionalities may define a classifier that serves to cluster workloads prior to feeding the input to a specialized model that can predict response times.

An example pipeline for the method according to some embodiments may follows the basics of the pipeline presented in A.4 herein, but with the addition of a measure of open-setness that may enable identification of unknown workloads as new, spawning a new class for the new workload, and spawning of a new model in case enough unknown workloads of a given type (cluster) are accumulated. The framework according to some embodiments may comprise two stages, namely, training and inference. The Inference stage itself may unravel into a workload adaptation stage. The various stages are explained in the sections below.

B.2 Training

The method according to some embodiments may comprise the training of ML models. This training process may involve gathering and centralizing data from many systems into a central node and then using these data to build a central dataset, as discussed in A.4 herein.

An example ML training process according to some embodiments may comprise the following operations:

(i) pre-processing data (data cleaning);
    (ii) add necessary new features to clean data (feature engineering);
    (iii) cluster workloads and train an open-set classifier; and
    (iv) build a specialist prediction model for each cluster.

Operations (i) and (ii) are performed as described in section A.4 herein. In one possible embodiment of this invention, an open-set model such as the C2AE may be used to learn a classification of clustered workloads. Some embodiments may first cluster the workloads according to a chosen subset of features, as discussed in connection with FIG. 3, and then apply an open-set model in cluster space supervised with each class index for each cluster. An aspect of step (iii) is to obtain an open-set model capable of classifying workloads into clusters. Step (iv) then trains one model per found cluster, where the model takes in a workload from a given cluster and predicts a response time. These models may be referred to as the specialist models, one per cluster.

FIG. 6 discloses an overview 600 of the training stage. As disclosed there, workload data, from a workload database 602 or elsewhere, may be grouped into clusters 604 in a clustering process. The clusters 604 and/or cluster information may be provided to an open-set model 606 that may be capable of determining that one or more of the workloads are new, and may also be capable of classifying the new workload. Each of the clusters may then be assigned a respective RT model 808 that is operable to predict response times respectively associated with the new workload(s).

With continued reference to the example of FIG. 6, the clustering may be performed using any suitable method, examples of which are disclosed herein at A.4, for clustering based on the chosen subset of features for a workload. The training of the open-set model may be performed through supervised learning with pairs (workload, cluster). The open-set model may be a classifier that is also able to output an open-setness score such, but not limited to, the C2AE discussed elsewhere herein.

B.3 Inference

A feature of some embodiments is predicting a response time, such as for a read or write operation, for a given unknown workload. When such a workload appears, some embodiments may perform various operations for inference and for dealing with possible open-setness. Some embodiments may assume the operations for training have been done, as in B.2 herein.

Figure 7:
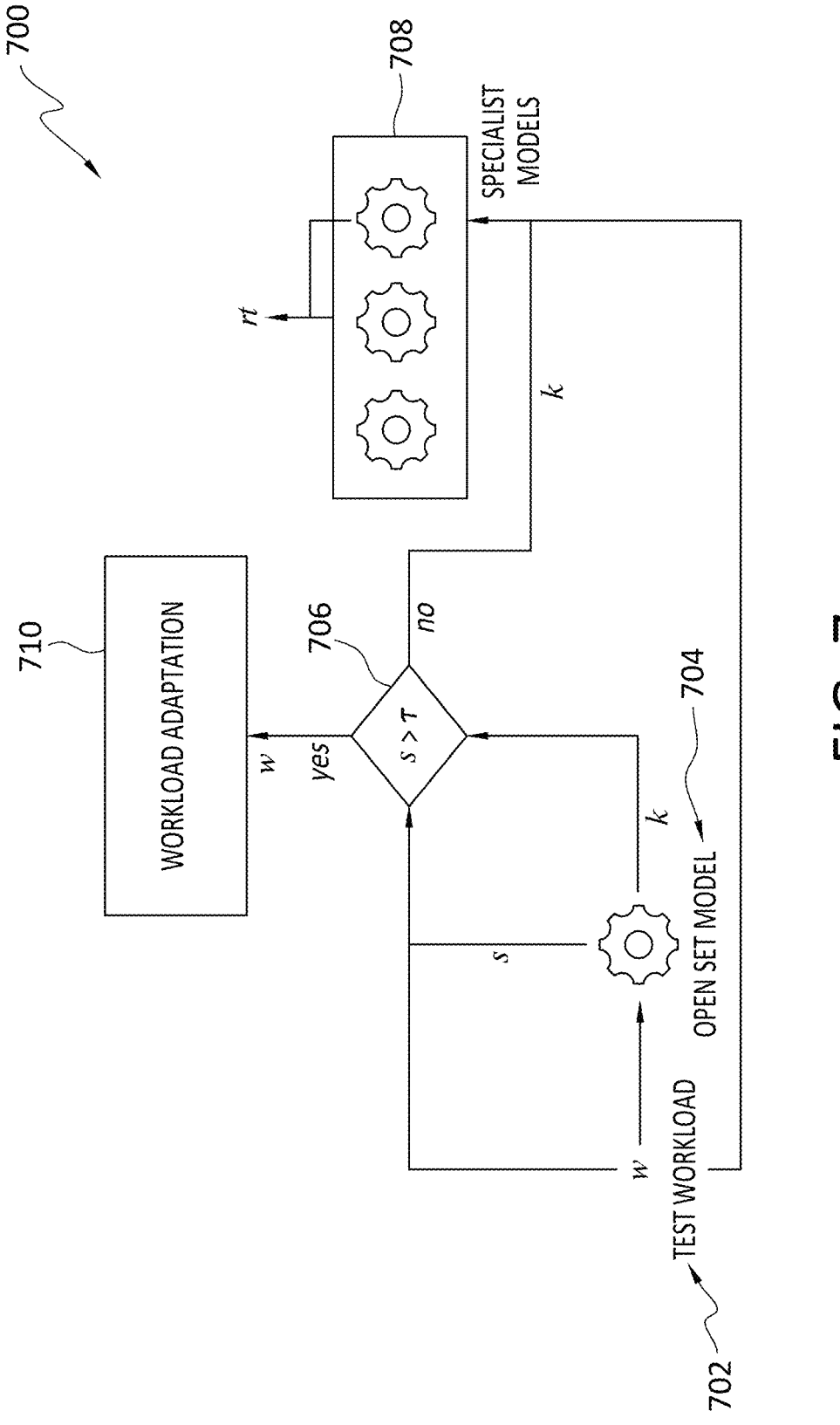
FIG. 7 discloses an overview of an example inference stage.

With attention now to FIG. 7, an overview of an example inference stage 700 is disclosed. This inference stage 700 may start with a given workload 702, which is sent through an open-set model 704 to obtain both a cluster prediction k and an open-setness score s. If the open-setness score is low enough, as determined at 706, then the workload 702 may be routed to the specialist model 708 according to the predicted cluster. If, however, the open-setness score s is high, as determined at 706, indicating that the workload 702 may be new, the workload adaptation stage 710 may be entered. The threshold r to be set, may be defined, for example, as the mean historical open-setness score for all clusters considering training workloads.

Figure 8:
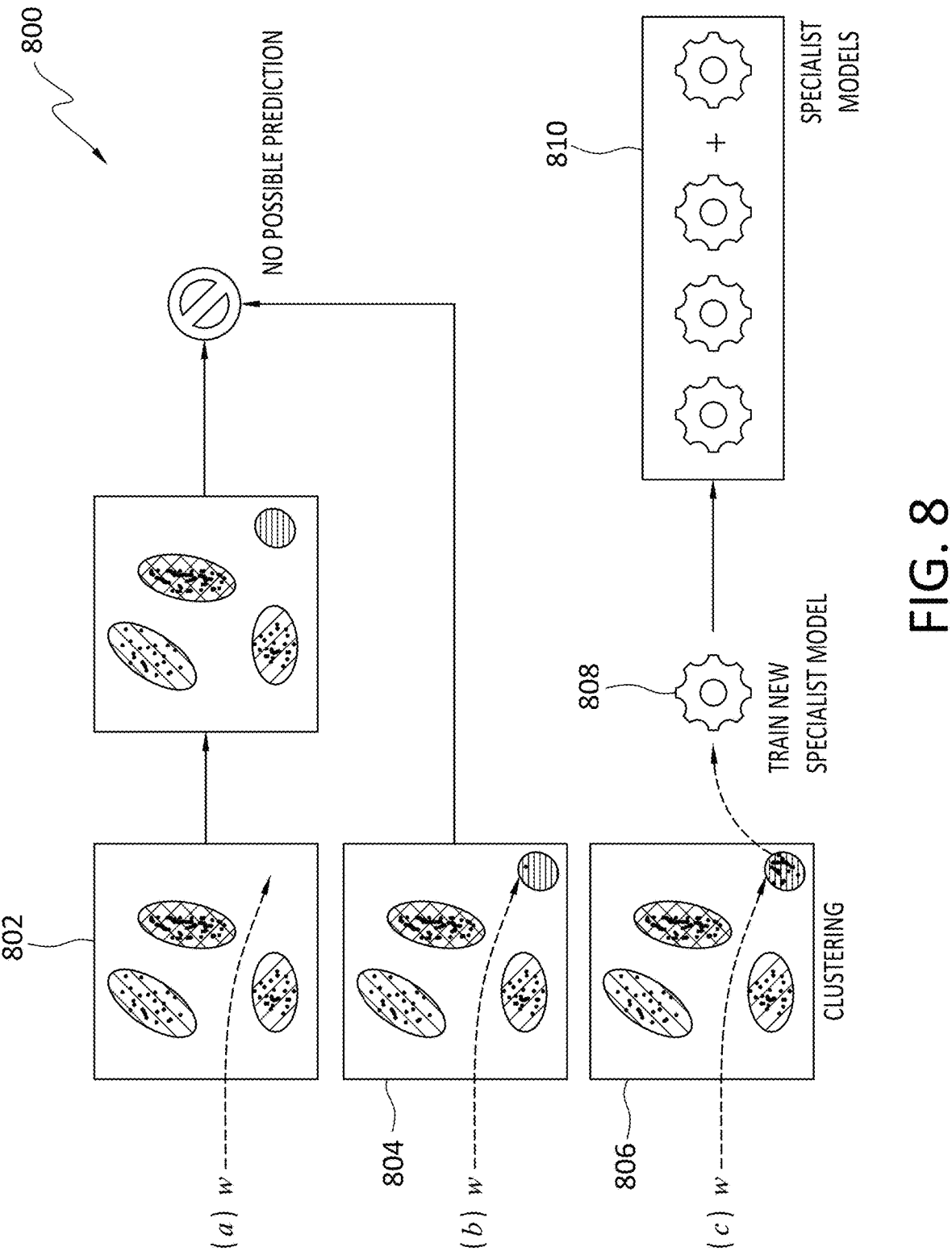
FIG. 8 discloses an overview of an example workload adaptation stage.

With attention now to FIG. 8, details are provided concerning aspects of an example workload adaptation stage 800. In this example, there is a workload w with a relatively high open-setness score. Here, three major cases are presented for the workload w, or simply the 'workload': case (a) 802 where the workload has no matching cluster; case (b) 804 where the workload has a matching cluster, but the cluster has a small number of elements; and case (c) 806 where the workload has a matching cluster with enough elements to trigger the training 808 of a new specialist model 810 for that cluster. Cases (a) and (b) may result in the framework outputting 'No Possible Prediction.' For all cases, the cluster matching procedure may be done through various techniques, such as the distance to centroid example discussed earlier, and both the cluster matching procedure and the threshold for the minimum number of elements to trigger the training of a new specialist model, could be defined.

C. Example Methods

Figure 9:
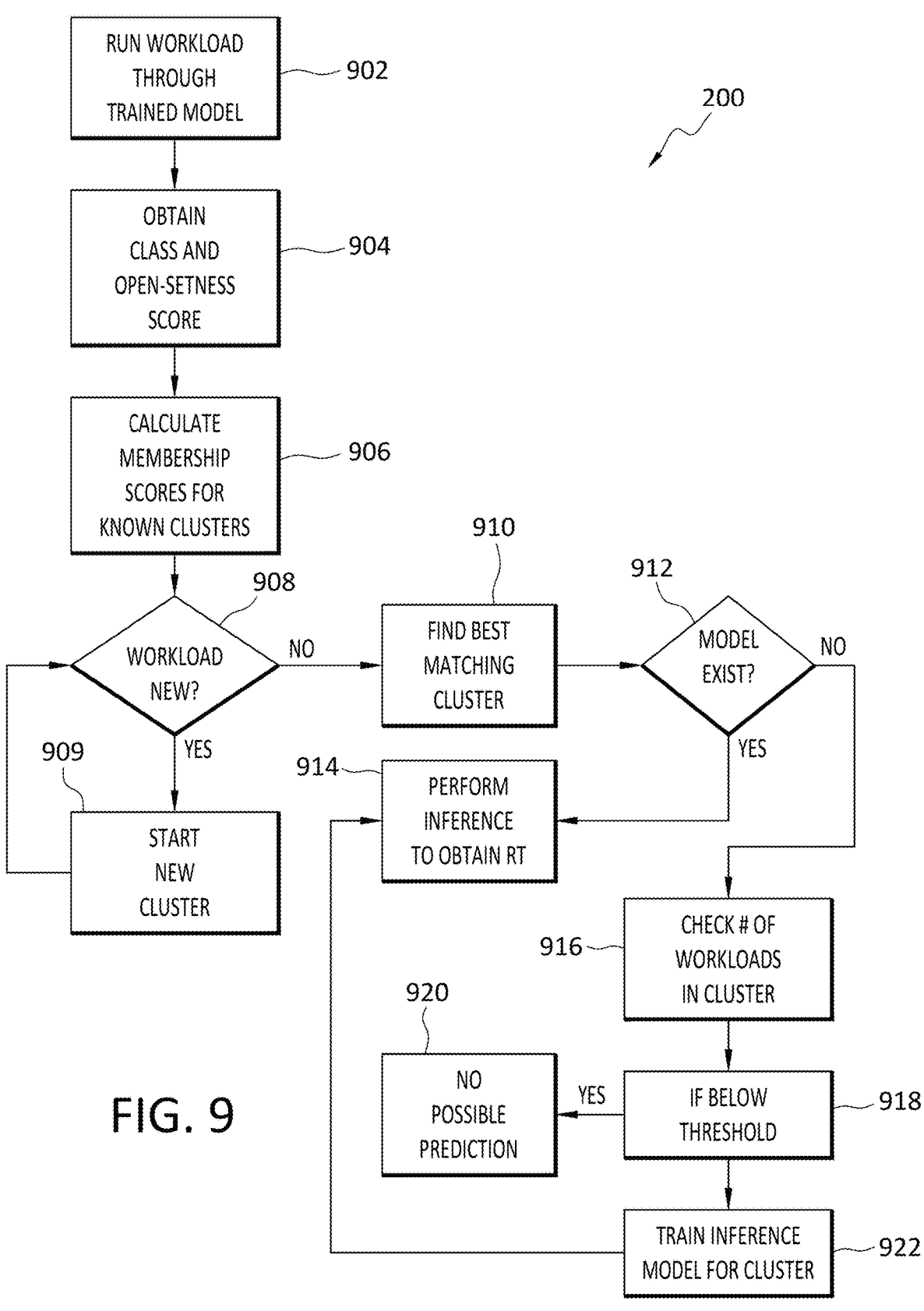
FIG. 9 discloses an example method, according to some embodiments.

It is noted with respect to the disclosed methods, including the example method of FIG. 9, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 9, and with continued reference to the example of FIG. 8, a method 900 is disclosed for an inference stage according to some embodiments. The example method 900 may begin at 902 where a workload is run through a trained open-set classification model, and a class and an open-setness score then obtained 904. Next, a membership score may be calculated 906 for each known cluster, and the open-setness and membership score aggregated to decide 908 if the workload is new.

If the workload is determined 908 to be new, a new cluster (class) may be started 910 for that workload, and the workload reassessed at 908 as not being a new workload. On the other hand, if it is determined 908 that the workload is not new, then the best matching cluster for that workload may be found 910. If it is determined 912 that the best matching cluster has a corresponding response time predictor model, then that model may be used to perform inference 914, for example, to obtain a response time for the workload. If it is determined 912 that there is no corresponding model, then a check 916 may be performed of the number of workloads in this cluster.

If the check 916 reveals that the number of workloads in the cluster is below 920 a given required threshold, the system may output 918 'No Possible Prediction.' Otherwise, an inference model may be trained 922 for the cluster, after which inferencing 914 may be performed with that model.

Note that for 902, some embodiments may assume the existence and use of a model, such as disclosed in Oza, that is able to output a class (cluster) and an open-setness score for a given sample. Among other things, the example method 900 may predict a response time for a workload for which a cluster could be found, as well as outputting "No Possible Prediction" whenever there is not enough data for that workload type. Additionally, some embodiments may also keep track of the growing number of elements in a new cluster to activate a training for a new specialist model to be added to the list. By doing this, embodiments may construct an adaptable method that grows the number of clusters as new workload types are identified.

D. Further Discussion

As will be apparent from this disclosure, example embodiments of the invention may possess various useful features and advantages. For example, some embodiments may combine disparate techniques in a framework for robust response time classification for storage systems telemetry. These techniques may include a combined measure of open-setness that enables identification of unknown workloads as new, spawning a new class for the new workload, and expansion to the creation of new clusters, and specialist response time prediction models corresponding to the new clusters, as required to assimilate new types of workloads

E. Further Example Embodiments

Following are some further example embodiments of the invention. These are presented only by way of example and are not intended to limit the scope of the invention in any way.

Embodiment 1. A method, comprising: running a workload through a trained open-set classification model; recovering, as a result of the running, a class and an open-setness score corresponding to the workload; determining, based on the class and the open-setness score, whether the workload is new; and when the workload is determined to be new, starting a new cluster that includes the workload.

Embodiment 2. The method as recited in embodiment 1, wherein the workload comprises 10 operations associated with a data storage system.

Embodiment 3. The method as recited in any of embodiments 1-2, wherein a response time predictor model associated with the new cluster performs an inferencing process that determines a response time, of a system, associated with the workload.

Embodiment 4. The method as recited in any of embodiments 1-3, wherein when the workload is determined not to be new, the workload is assigned to a best matching cluster.

Embodiment 5. The method as recited in any of embodiments 1-4, wherein the workload comprises workload characteristics and a system configuration for a system that processes the workload.

Embodiment 6. The method as recited in any of embodiments 1-5, wherein when the workload is determined not to be new, and no response time predictor model exists for a best matching cluster corresponding to the workload, an output of 'no possible prediction' is generated when a number of workloads in the best matching cluster is below a threshold.

Embodiment 7. The method as recited in any of embodiments 1-6, wherein when the workload is determined not to be new, and no response time predictor model exists for a best matching cluster corresponding to the workload, a response time predictor model is trained for the workload when a number of workloads in the best matching cluster is above a threshold.

Embodiment 8. The method as recited in any of embodiments 1-7, wherein the new cluster is specifically associated with a response time predictor model operable to perform an inferencing process that determines a response time, of a system, associated with the workload.

Embodiment 9. The method as recited in any of embodiments 1-8, wherein the open-setness score reflects a relative newness of the workload.

Embodiment 10. The method as recited in any of embodiments 1-9, wherein the open-set classification model is operable to classify workloads into clusters.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
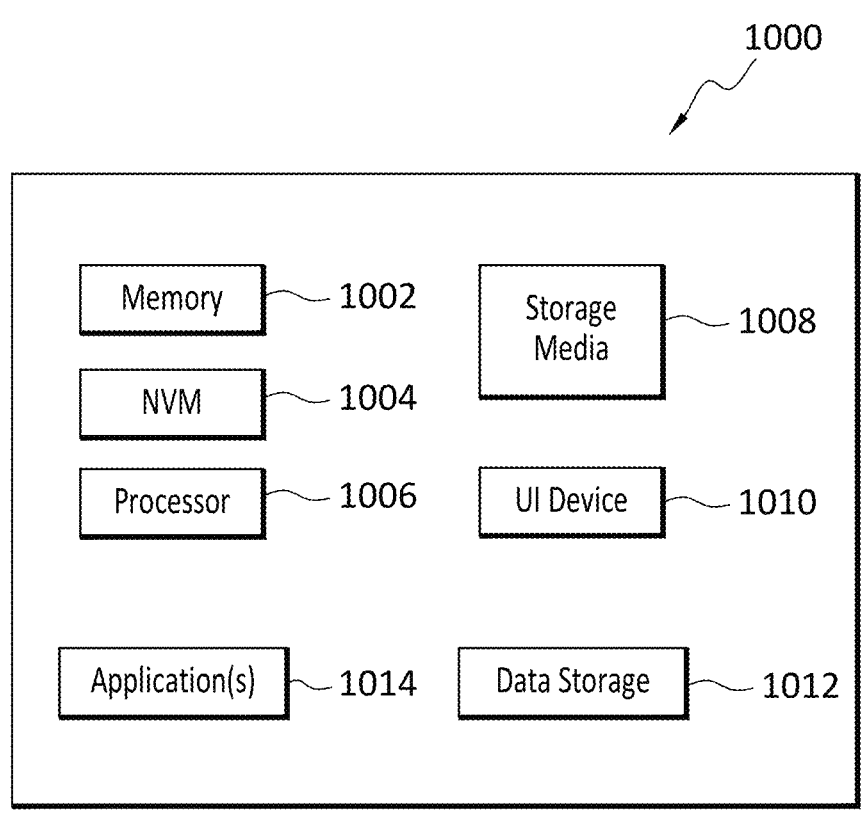
FIG. 10 discloses an example computing entity operable to perform any of the disclosed methods, processes, and operations.

With reference briefly now to FIG. 10, any one or more of the entities disclosed, or implied, by FIGS. 1-9 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI (user interface) device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   running a workload comprising telemetry data including workload characteristics and system configuration parameters of a data storage system through a trained open-set classification model that has been trained using clustered workloads and supervised with cluster identifiers;
   recovering, as a result of the running, a class and an open-setness score corresponding to the workload;
   calculating a membership score for each of a plurality of known clusters based on a distance between the workload and a centroid of each known cluster;
   aggregating the open-setness score with membership scores to determine whether the workload corresponds to a previously unseen workload type;
   determining, based on the aggregated open-setness score and the membership scores, whether the workload is new; and
   when the workload is determined to be new, starting a new cluster that includes the workload and storing the workload in association with the new cluster for subsequent training of a response-time predictor model.

2. The method as recited in claim 1, wherein the workload comprises IO operations associated with a data storage system.

3. The method as recited in claim 1, wherein after training based on stored workloads associated with the new cluster, a response time predictor model associated with the new cluster performs an inferencing process that determines a response time, of a system, associated with the workload.

4. The method as recited in claim 1, wherein when the workload is determined not to be new, the workload is assigned to a best matching cluster.

5. The method as recited in claim 1, wherein the workload comprises workload characteristics and a system configuration for a system that processes the workload.

6. The method as recited in claim 1, wherein when the workload is determined not to be new, and no response time predictor model exists for a best matching cluster corresponding to the workload, an output of 'no possible prediction' is generated when a number of workloads in the best matching cluster is below a threshold.

7. The method as recited in claim 1, wherein when the workload is determined not to be new, and no response time predictor model exists for a best matching cluster corresponding to the workload, a response time predictor model is trained for the workload when a number of workloads in the best matching cluster is above a threshold.

8. The method as recited in claim 1, wherein the new cluster is specifically associated with a response time predictor model after the response time predictor modal is trained using workloads stored in association with the new cluster operable to perform an inferencing process that determines a response time, of a system, associated with the workload.

9. The method as recited in claim 1, wherein the open-setness score reflects a relative newness of the workload.

10. The method as recited in claim 1, wherein the open-set classification model is operable to classify workloads into clusters.

11. A non-transitory storage medium having stored therein instructions that are executable by one or more hardware processors to perform operations comprising:
    running a workload comprising telemetry data including workload characteristics and system configuration parameters of a data storage system through a trained open-set classification model that has been trained using clustered workloads and supervised with cluster identifiers;
    recovering, as a result of the running, a class and an open-setness score corresponding to the workload;

calculating a membership score for each of a plurality of known clusters based on a distance between the workload and a centroid of each known cluster;

aggregating the open-setness score with the membership scores to determine whether the workload corresponds to a previously unseen workload type;

determining, based on the aggregated open-setness score and the membership scores, whether the workload is new; and when the workload is determined to be new, starting a new cluster that includes the workload and storing the workload in association with the new cluster for subsequent training of a response-time predictor model.

12. The non-transitory storage medium as recited in claim 11, wherein the workload comprises IO operations associated with a data storage system.

13. The non-transitory storage medium as recited in claim 11, wherein after training based on stored workloads associated with the new cluster, a response time predictor model associated with the new cluster performs an inferencing process that determines a response time, of a system, associated with the workload.

14. The non-transitory storage medium as recited in claim 11, wherein when the workload is determined not to be new, the workload is assigned to a best matching cluster.

15. The non-transitory storage medium as recited in claim 11, wherein the workload comprises workload characteristics and a system configuration for a system that processes the workload.

16. The non-transitory storage medium as recited in claim 11, wherein when the workload is determined not to be new, and no response time predictor model exists for a best matching cluster corresponding to the workload, an output of 'no possible prediction' is generated when a number of workloads in the best matching cluster is below a threshold.

17. The non-transitory storage medium as recited in claim 11, wherein when the workload is determined not to be new, and no response time predictor model exists for a best matching cluster corresponding to the workload, a response time predictor model is trained for the workload when a number of workloads in the best matching cluster is above a threshold.

18. The non-transitory storage medium as recited in claim 11, wherein the new cluster is specifically associated with a response time predictor model after the response time predictor model is trained using workloads stored in association with the new cluster operable to perform an inferencing process that determines a response time, of a system, associated with the workload.

19. The non-transitory storage medium as recited in claim 11, wherein the open-setness score reflects a relative newness of the workload.

20. The non-transitory storage medium as recited in claim 11, wherein the open-set classification model is operable to classify workloads into clusters.

* * * * *